(12) United States Patent
Yamazaki

(10) Patent No.: US 6,639,690 B1
(45) Date of Patent: Oct. 28, 2003

(54) PRINT SYSTEM

(75) Inventor: Yoshirou Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/324,052

(22) Filed: Jun. 2, 1999

(30) Foreign Application Priority Data

Jun. 2, 1998 (JP) ............................................ 10-152783

(51) Int. Cl.$^7$ ................................................ G06F 15/00
(52) U.S. Cl. ..................... 358/1.16; 358/1.8; 358/1.9; 358/296.298; 355/40; 355/55
(58) Field of Search ................................ 358/296, 298, 358/1.1, 1.8, 1.9, 1.18, 1.16; 355/55, 40; 396/311; 382/118, 157

(56) References Cited

U.S. PATENT DOCUMENTS 4,969,049 A * 11/1990 Mitani et al. ................ 358/296
5,701,530 A * 12/1997 Fujino ......................... 396/311
6,035,055 A *  3/2000 Wang et al. ................ 382/118

FOREIGN PATENT DOCUMENTS

JP          9-18704     1/1997     ............. H04N/1/40
JP          9-182093    1/1997     ............. H04N/9/11

\* cited by examiner

*Primary Examiner*—Mark Wallerson
*Assistant Examiner*—Twyler Lamb
(74) *Attorney, Agent, or Firm*—Sughrue Mion, PLLC

(57) ABSTRACT

A print system for performing image processing on an original image and outputting a print in which the original image is reproduced. The system includes image processing unit to process the original image or image data thereof; setting unit for setting the image processing in the image processing unit with the original image as image data, in accordance with the image data or an instruction input from outside; storing unit for storing image processing information of the original image processed by the image processing unit and retrieval information for retrieving the original image; and retrieval unit for retrieving image processing information of a corresponding original image corresponding to the supplied retrieval information, wherein when reprocessing the original image the setting unit sets an image processing by the processing unit in this reprocessing by adding image information retrieved by retrieval unit.

27 Claims, 3 Drawing Sheets

PRINT SYSTEM

BACKGROUND OF THE INVENTION

The present invention relates to a technical field of a print system for outputting mainly a print (photography) in which an image taken on a film is reproduced.

Currently, images recorded on photographic film such as negative film, reversal film and the like (hereinafter referred to simply as film) have been commonly printed on light-sensitive material (photographic paper) by means of direct (analog) exposure in which a film image is projected onto the light-sensitive material.

In recent years, a digital photo printer using digital exposure has been developed to a practical application level. According to this new technology, an image recorded on a film is read photoelectrically and the read image is converted to digital signals and subjected to various image processing to produce output image data for recording purpose. A light-sensitive material is scanned and exposed by a recording light modulated depending on this image data so as to record an image (latent image), which is subsequently developed to produce a (finished) print.

In the digital photoprinter, images are handled as digital image data so that an exposure condition for print can be determined by image data processing. Therefore, it is possible to carry out effective image processing operations such as the correction of washed-out highlights or dull shadows caused by photographing with backlight or an electronic flash or the like, sharpness processing, the correction of color or density failure and the like. As a result, a high quality print which has never been realized by a conventional direct exposure can be obtained. Further, composition of plural images, splitting an image to plural image sections, composition of characters or the like can be achieved by image data processing and freely edited/processed print corresponding to a purpose can be output.

Further, in the digital photoprinter, not only an image can be output as a print (photography) but also image data can be supplied to a computer or the like and recorded in such a recording medium as a floppy disk. Therefore, the image data can be used for various purpose other than photography.

The digital photoprinter having such features basically comprises a scanner (image reading apparatus) for reading an image recorded on the film photoelectrically by projecting a reading light to a film and reading its projection light, an image processing apparatus for carrying out a specified image processing on an image data read by the scanner or an image data supplied from a digital camera or the like so as to obtain an output image data for image recording, that is, exposure condition, a printer (image recording apparatus) for recording the image as a latent image by exposing a light-sensitive material by, for example, scanning with light beam corresponding to an image data output from the image processing apparatus, and a processor (developing apparatus) for carrying out development processing on a light-sensitive material exposed by the printer so as to produce a (finished) photographic print in which an image is reproduced.

In the photographic print relying upon the film, there often occurs an opportunity that an image (frame) printed once is output again as a reprint to meet a request for the reprinting. In this case, it is demanded that the color and density of the image coincide with a previously output print (usually, print output at the time of the simultaneous printing that is carried simultaneously with developing the photographed film).

However, there often occurs a case in which the color and density of the image differ between the preceding print and the reprint because of an error in judgment or operation of an operator, so that such a complaint from a customer is often heard.

SUMMARY OF THE INVENTION

Accordingly, the present invention has been achieved to solve the problems of such conventional technology and therefore, it is an object of the invention to provide a print system for outputting a print in which an image recorded on a photographic film or an image recorded with a digital camera is reproduced, the print system being capable of reproducing an image whose color and density are equal to a previous print or a preceding print stably on a reprint or at a following print to meet a request therefor or the like.

In order to attain the object described above, the invention provides a print system for performing image processing on an original image and outputting a print in which said original image is reproduced as a visible image, comprising:

image processing means for performing the image processing on said original image or image data thereof;

setting means for setting the image processing in said image processing means with said original image as image data, in accordance with at least one of the image data and an instruction input from outside;

storage means for storing image processing information of said original image processed by said image processing means and retrieval information for retrieving the original image with correspondence therebetween; and retrieval means for retrieving the image processing information of the original image of interest in accordance with supplied retrieval information, wherein when said storage means reprocesses the original image storing the image processing condition and the retrieval information, said setting means sets the image processing by said image processing means in this reprocessing by adding the image processing information retrieved by said retrieval means.

The invention also provides a print system, comprising:

image processing means for performing image processing on an original image or image data thereof; and image outputting means for outputting a photographic print in which said original image is reproduced as a visible image;

wherein image processing information of said original image at preceding printing can be used again at following printing; further comprising:

storage means for storing said image processing information of said original image at the preceding printing and retrieval information used for retrieving an original image information corresponding to said image processing information at the following printing;

retrieval means for retrieving a relevant original image information among a plurality of the original image information stored by the storage means, based on the retrieval information used for retrieving the original image information at the following printing;

setting means for setting the image processing information of said original image at the following printing, based on said relevant original image information retrieved by retrieval means;

where in said image processing means subjects said original image or said image data thereof to the image processing in accordance with the image processing information set by said setting means and then, said image outputting means outputs a following photographic print based on the original image or the image data thereof subjected to said image processing by said image processing means.

The invention further provides a photographic printer (print system) capable of utilizing print preparation condition of an original image at preceding printing for following printing again, comprising:

print preparation information storage means for storing the print preparation condition of the original image at said preceding printing and retrieval information to be used for retrieving, at said following printing, an original image information corresponding to said print preparation condition of the original image;

retrieval information inputting means for inputting retrieval information to be used for retrieving said original image information at said following printing;

original information retrieval means for retrieving a relevant original image information from among a plurality of said original image information stored in said print preparation information storage means based on said retrieval information inputted by said retrieval information inputting means;

print condition determination means for determining the print preparation condition of said original image at said following printing corresponding to said relevant original image information retrieved by said original image information retrieval means; and photographic print preparation means for preparing a photographic print out of said original image at said following printing in accordance with the print preparation condition of said original image at said following printing determined by said print condition determination means.

It is preferable that the print system further comprises retrieval information inputting means for inputting said retrieval information.

It is also preferable that the print system further comprises image inputting means for inputting said original image or image data of said original image.

Preferably, the setting means obtains said original image as image data at said preceding printing and sets said image processing information in accordance with at least one of the thus obtained image data and a command to be inputted from outside.

Preferably, said preceding printing represents simultaneous printing whereas said following printing represents reprinting.

Preferably, said image processing information includes kind, order and image processing condition of said image processing to be performed by said image processing means.

Preferably, said storage means stores said image processing information and said retrieval information in a site accessible from a plurality of print systems through a network.

Preferably, said retrieval means retrieves a plurality of sites accessible through a network.

Preferably, said image processing information stored by said storage means includes at least one of the image processing information to be automatically set and the image processing information to be inputted from outside.

Preferably, said image processing information stored by said storage means includes at least one of image input condition, image output condition, a thumbnail image, image characteristic quantity of said original image and image characteristic quantities of a plurality of images processed prior to said original image.

Preferably, said retrieval information stored by said storage means includes at least one of film ID, DX code, user ID, information capable of specifying an image processing apparatus comprising said image processing means, date and time of having performed the image processing, frame number, image characteristic quantity of said original image, image characteristic quantities of a plurality of images processed prior to said original image, histogram information, histogram information of each block image produced by splitting said original image into blocks and image data of low resolution image of said original image.

Here, it is more preferable that the retrieval information includes the image characteristic quantities of a plurality of image processed prior to said original image in addition to the image characteristic quantity of said original image.

Preferably, each block image produced by splitting said original image into blocks is obtained by splitting image region of said original image in point symmetry.

Preferably, said low resolution image is at least one of an image having the number of pixels being 16×16 or less or an image having gradation resolution different from that of said original image.

That is to say, the storage means may store as the retrieval information the low resolution image, for example, a result obtained by subjecting a prescanned image to DCT (discrete cosine transform) operation, namely a result obtained by compressing image data in accordance with an international standard coding system of a color still image.

Preferably, said retrieval information inputting means inputs as said retrieval information at least one of film ID, DX code, user ID, information capable of specifying an image processing apparatus comprising said image processing means, date and time of having performed the image processing, frame number, image characteristic quantity of said original image and image characteristic quantities of a plurality of images processed prior to said original image.

Preferably, said retrieval information to be inputted by said retrieval information inputting means includes information based on at least one of back print information of the photographic print, a customer card, a magnetic recording layer of a film image and information recording means of the film image.

Preferably, at least one of the back print information of said photographic print, the customer card, the magnetic recording layer of the film image and the information recording means of the film image includes at least one of film ID, DX code, user ID, information capable of specifying an image processing apparatus comprising said image processing means, date and time of having performed the image processing and frame number.

Preferably, said retrieval means retrieves as said retrieval information in a combination manner at least one of film ID, DX code, user ID, information capable of specifying an image processing apparatus comprising said image processing means, date and time of having performed the image processing and frame number.

Preferably, said retrieval means includes as said retrieval information at least one of image characteristic quantity of image of said following photographic print, image characteristic quantities of a plurality of images processed prior to the image of said following photographic print, histogram information of image of said following photographic print, histogram information of each block image produced by splitting the image of said following photographic print into blocks, image data of low resolution image of said following photographic print and image data of low resolution images of a plurality of images which are before and after the image of the photographic print including the image itself. Here, it is preferable that splitting the image into the blocks is splitting image region of the original image in point symmetry.

Preferably, said retrieval means is capable of performing confirmation by representing at least one of thumbnail image of the original image at said preceding printing, low resolution image of the image at said preceding printing and low resolution images of a plurality of images which are before and after the image at said preceding printing including the image itself.

Preferably, said retrieval means further performs confirmation by representing simultaneously at least one of the thumbnail image at said following printing, the low resolution image of image at said following printing and low resolution images of a plurality of images which are before and after the image at said following printing including the image itself.

Preferably, said setting means performs recalculation by reference to at least one of image processing condition to be inputted from outside at said preceding printing, image inputting condition and image outputting condition both at said preceding printing, image characteristic quantity at said preceding printing and image characteristic quantities of a plurality of images processed prior to the preceding printing together with the image characteristic quantity at said preceding printing.

DETAILED DESCRIPTION OF THE INVENTION

Hereinafter, preferred embodiments of a print system of the present invention will be described in detail with reference to the accompanying drawings.

Figure 1:
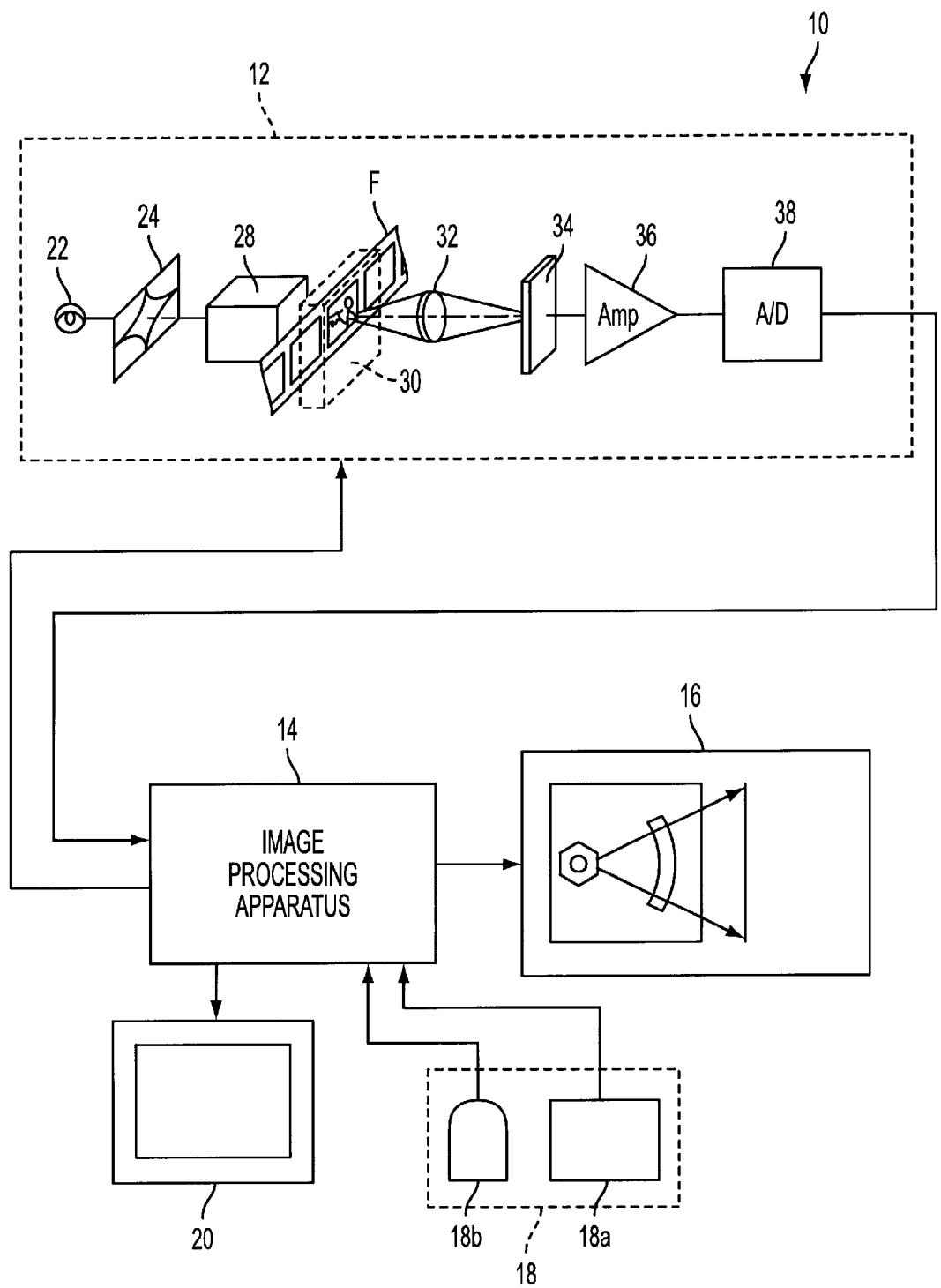
FIG. 1 is a block diagram showing an embodiment of a digital photo printer using a print system of the present invention.

FIG. 1 shows a block diagram of an embodiment of a digital photo printer using a print system of the present invention.

The digital photoprinter (hereinafter referred to as photo printer) 10 shown in FIG. 1 basically comprises a scanner (image reading apparatus) 12 for reading an image recorded on a film F photoelectrically, an image processing apparatus 14 for carrying out image processing on the read image data (image information) and manipulating and controlling a photoprinter 10 entirely, and a printer (image recording apparatus) 16 for exposing the light-sensitive material (photographic paper) with light beams modulated in accordance with the image data output from the image processing apparatus 14 and carrying out development processing to output a (finished) print.

A manipulating unit 18 having a key board 18a and a mouse 18b for inputting (setting) various conditions, a selection and instruction of a processing, instruction of specific color/density correction and the like and a display 20 for displaying an image read by the scanner 12, various control pictures for setting or registering various operating instructions and conditions, and the like are connected to the image processing apparatus 14.

The scanner 12 reads an image recorded on the film F or the like one frame by one frame photoelectrically, and comprises a light source 22, a variable diaphragm 24, a diffusion box 28 for diffuse a reading beam incident on the film F so that it become uniform across the plane of the film F, a focusing lens unit 32, an image sensor 34 having line CCD sensors corresponding to respective image reading for R (red), G (green) and B (blue), an amplifier (Amp) 36 and an A/D (analog/digital) converter 38.

In the photoprinter 10, dedicated carriers mountable to the main body of the scanner 12 is prepared depending on the kind of film such as a negative film (or reversal film) of Advanced Photo System (APS) and 135 size, and film type such as stripes, slide and the like. By replacing the carrier, this can meet various films and processings. An image (frame) recorded in the film and supplied for print production is transported to a specified reading position by this carrier.

When such scanner 12 reads an image recorded on the film F, a reading light emitted from the light source 22 and adjusted in terms of light amount by the variable diaphragm 24 is incident on (the corresponding frame of) the film F located at a specified reading position by the carrier and passes therethrough to obtain a projection light carrying the image recorded on the film F.

Figure 2A:
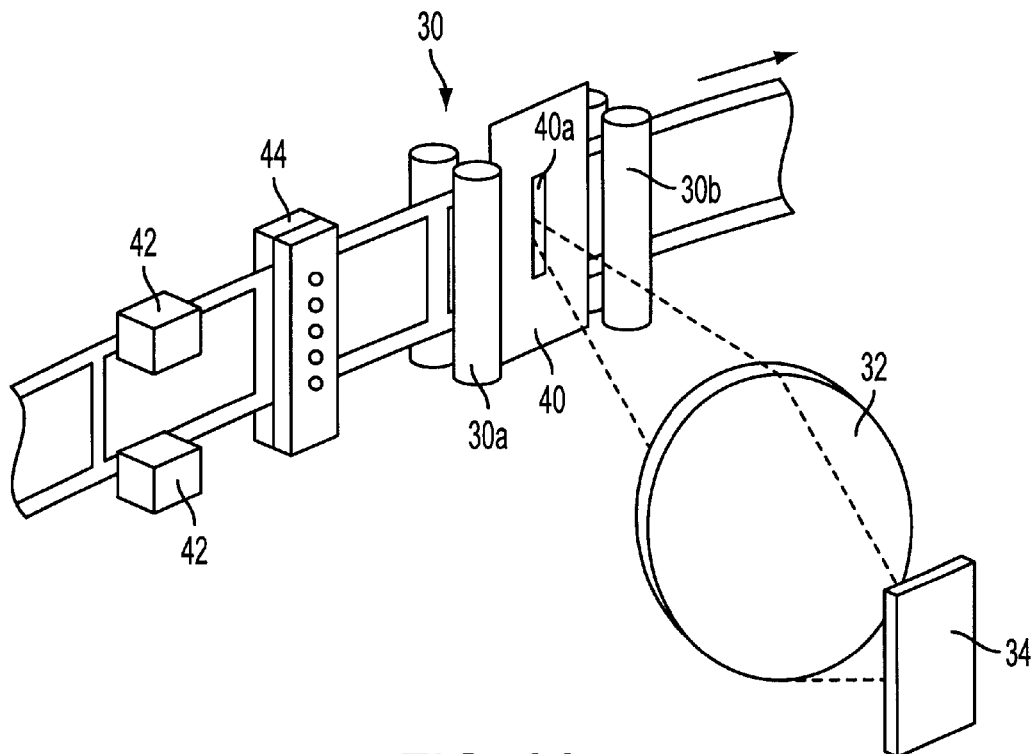
FIG. 2A is a schematic view of a scanner to be mounted on the digital photo printer shown in FIG. 1.

As shown schematically in FIG. 2A, the illustrated carrier 30 has a pair of transport roller pairs 30a and 30b and a mask 40 having a slit 40a. The transport roller pairs 30a and 30b are provided on opposite sides of the specified reading position in an auxiliary scanning direction which is perpendicular to the direction in which the line CCD sensors in the image sensor 34 extend (i.e., the main scanning direction) and they transport the film F with its length being parallel to the auxiliary scanning direction as it is in registry with the reading position. The slit 40a defines the projected light from the film F to have a specified narrow shape, is in registry with the reading position and extends in the main scanning direction.

Being held in registry with the reading position, the film F is transported in the auxiliary scanning direction by means of the carrier 30 as it is illuminated with the reading light. Consequently, the film F is subjected to two-dimensional slit scan with the reading light passing through the slit 40a extending in the main scanning direction, whereupon the image of each frame recorded on the film F is read.

A magnetic recording medium is formed on a film of the Advanced Photo System and the carrier meeting the film (cartridge) of this Advanced Photo System contains magnetic heads 42 for reading information recorded on the magnetic recording medium and recording a necessary information. Information recorded in the magnetic recording medium of the film is read by the magnetic heads 42 of the carrier 30 and sent from the main body of the scanner 12 to sites such as the image processing apparatus 14 and the like. Alternatively, information from the image processing apparatus 14 or the like is sent to the carrier 30 via the main body of the scanner 12 and recorded on the magnetic recording medium of the film F by the magnetic heads 42.

Further, the carrier 30 has a (bar) code reader 44 for reading bar codes such as DX code, extended DX code and FNS code optically recorded on a film and various information optically recorded on the film. Various code information and various information read by the code reader 44 are sent to sites such as the image processing apparatus 14 and the like.

As described above, the reading light passes through the film F carried by the carrier 30 so that it becomes a projection light bearing an image. This projection light is focused on a light receiving surface of the image sensor 34 by the focusing lens unit 32.

Figure 2B:
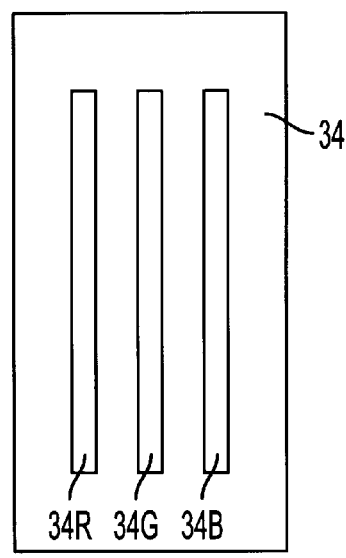
FIG. 2B is a schematic view of an image sensor allocated to the digital printer shown in FIG. 1.

As shown in FIG. 2B, the image sensor 34 is so-called a 3-line color CCD sensor having a line CCD sensor 34R for reading red image, a line CCD sensor 34G for reading green image, and a line CCD sensor 34B for reading blue image. Those line CCD sensors are extended in the main scanning direction as described above. The projection light of the film F is separated to three primary colors, red, green and blue by this image sensor 34 and read photoelectrically.

An output signal of the image sensor 34 is amplified by an amplifier 36, converted to digital signal by an A/D converter 38 and sent to the image processing apparatus 14.

In the scanner 12, the images recorded on the film F are captured by two scans, the first being prescan of reading at a low resolution and the second being fine scan for obtaining output image data of an output image.

The prescan is performed at a preliminarily set prescan reading condition which ensures that the images on all films which the scanner 12 is about to read can be read without saturating the image sensor 34. On the other hand, the fine scan is performed at fine scan reading condition for each frame, which is set by the prescan data so that the image sensor 34 is saturated by a density slightly lower than the minimum density of the image (frame) of interest. Therefore, output signals of the prescan and fine scan have different resolution and output level although the same image is scanned.

According to the present invention, the scanner is not restricted to a type by slit scanning, but may be a type employing a face exposure for reading an entire face of a single image all at once. In this case, for example, an area CCD sensor is employed. Filter insertion means for red, green and blue are provided between the light source and film F, and color filters are inserted therein. Reading of an image by the area CCD sensor is carried out by inserting alternately the red, green and blue filters in succession so that an image recorded on the film is separated to three primary colors.

In addition to the image on the film F read by the scanner 12, it is permissible to produce a print P by reproducing an image sent from various image data supply source such as image an image reading apparatus for reading a reflection material, image pickup devices such as digital camera and digital video camera and communication means such as LAN (local area network) and computer communication network, various image reading means and image pickup means for various media (recording medium) such as memory card (PC card), MO (magneto-optic recording medium), photo CD, and data storage means.

As described above, an output signal (output image data) from the scanner 12 is output to the image processing apparatus 14.

Figure 3:
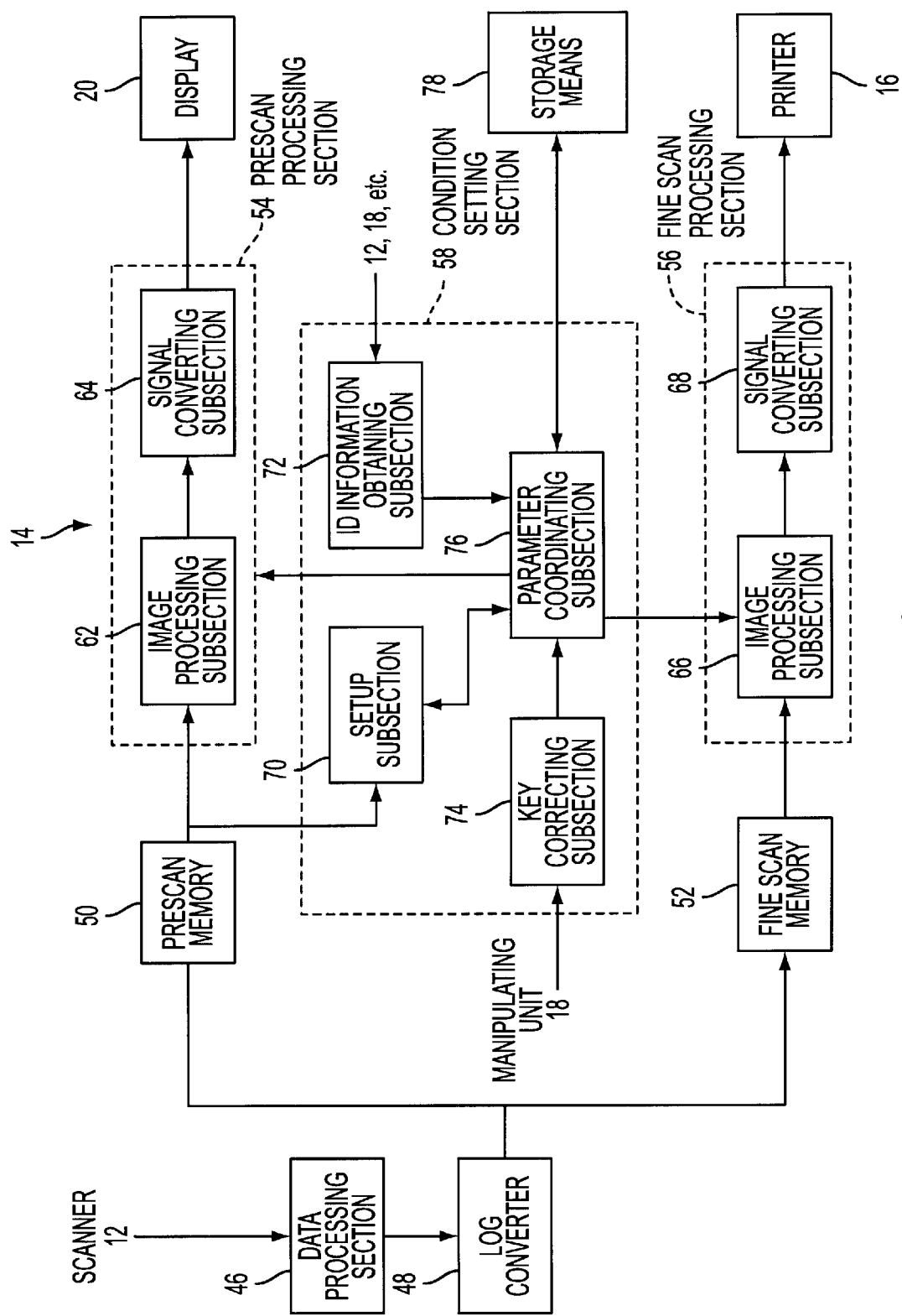
FIG. 3 is a block diagram showing an embodiment of an image processing apparatus of the digital photo printer shown in FIG. 1.

FIG. 3 shows a block diagram of the image processing apparatus 14. As shown in FIG. 3, the image processing apparatus (hereinafter referred to as processing apparatus) 14 comprises a data processing section 46, a log converter 48, a prescan (frame) memory 50, a fine scan (frame) memory 52, a prescan processing section 54, a fine scan processing section 56 and a condition setting section 58.

FIG. 3 shows mainly sites relating to the image processing. In addition to the components shown here, the image processing apparatus 14 contains a CPU for controlling the entire photoprinter 10 including the image processing apparatus 14, a memory for storing information necessary for operation of the photoprinter 10, means for determining a stop value (e.g. F-number) of the variable diaphragm 24 and storage time of the CCD sensor 34 and the like. A manipulating unit 18 and a display 20 are connected to respective sites through this CPU (CPU bus).

Respective output signals for red, green and blue output from the scanner 12 are subjected to predetermined processing for DC offset correction, darkness correction, shading correction and the like by the data processing section 46 and converted to digital image data by the log converter 48. Prescan (image) data is stored in the prescan memory 50 and fine scan (image) data is stored in the fine scan memory 52.

The prescan data stored in the prescan memory 50 is processed by a prescan processing section 54 and the fine scan data stored in the fine scan memory 52 is processed by a fine scan processing section 56.

The prescan processing section 54 comprises an image processing subsection 62 and a signal converting subsection 64. The fine scan processing section 56 comprises an image processing subsection 66 and a signal converting subsection 68.

The image processing subsection 62 (hereinafter referred to as processing subsection 62) of the prescan processing section 54 and the image processing subsection 66 (hereinafter referred to as processing subsection 66) of the fine scan processing section 56 process images (image data) read by the scanner 12 in accordance with the setting of a condition setting section 58 which will be described in detail later. Basically both processing subsection 62 and 66 carry out the same processing although the pixel density of image data to be processed is different.

As the image processing at the processing subsection 62 and processing subsection 66, one or more of gray balance adjustment, tone (gradation) adjustment, density adjustment, saturation adjustment, aberration correction such as geometrical distortion correction, marginal lumination correction, sharpness processing (sharpening), dodging processing, electronic magnification, special finishing such as soft focus finishing and monochrome finishing, red eye correction, well known various image processings are exemplified.

These corrections may be executed according to a well known method and ordinarily, processing computation, processing by LUT (lookup table), matrix (MTX) computation, processing by low pass filter (LPF) and the like are combined appropriately.

If taking an example, for gray balance adjustment, density adjustment, and tone adjustment, a method using LUT produced in accordance with the image characteristic quantity is exemplified. Usually, the correction tables are produced for each of red, green and blue.

For saturation adjustment, a method by MTX computation is exemplified.

For sharpness processing, a method in which an image is divided to three frequency components, that is, low, intermediate and high frequency components, sharpness gain (sharpness correction coefficient) is multiplied with a luminance signal obtained from the intermediate and high frequency components and obtained luminance information is added to the low frequency component is exemplified.

According to an example of the dodging processing method, vignette image (data) is produced by a luminance signal produced by converting the image data or filtering processing and a LUT or the like is produced using this vignette image. By compressing or enlarging a high density region or a low density region by image data processed with this LUT or the like, dynamic range of the image is compressed or enlarged while holding its intermediate tone so as to apply an effect of dodging under a direct exposure (see JP-A-9-18704 and JP-A-9-182093).

The aberration correction such as geometrical distortion correction and marginal lumination correction correct an aberration such as an image distortion or a drop of marginal lumination which is caused by the lens characteristic. According to an example of this correction method, a pixel position is corrected according to a function expression indicating an image distortion or a drop of marginal lumination and the density corresponding to the drop of marginal lumination is adjusted. Meanwhile, usually, the function expressions are produced for each of red, green and blue.

The signal converting subsection 64 of the prescan processing section 54 converts image data processed by the processing subsection 62 by means of three-dimensional LUT so as to obtain image data corresponding to a representation on the display 20.

On the other hand, the signal converting subsection 68 of the fine scan processing section 56 converts image data processed by the processing subsection 66 by means of three-dimensional LUT or the like so as to obtain output image data corresponding to image recording by the printer 16 and supplies to the printer 16. The printer 16 scans a light-sensitive material (photographic paper) with light beam modulated corresponding to this output image data so as to form a latent image and this image is subjected to a specified development processing and output as a print.

Processing conditions in the both converting subsections 64 and 68 are set by a condition setting section 58.

The image processing to be carried out by the prescan processing section 54 and fine scan processing section 56 and its image processing condition are set by a condition setting section 58.

This condition setting section 58 comprises a setup subsection 70, an ID information obtaining subsection 72, a key correcting subsection 74, and a parameter coordinating subsection 76. A storage means 78 for storing retrieval information about a frame whose print is already produced at the preceding printing and image processing information of that frame under a correspondence therebetween is connected to the parameter coordinating subsection 76.

At the time of simultaneous print, the retrieval information and image processing information are stored in the storage means 78 when a photographic print is produced so that, in the description below, the preceding printing is referred to as the simultaneous printing as well as the following printing is referred to as the reprinting. However, the invention is not limited to the above case and may be applied to a case where the preceding printing is referred to as the reprinting as well as all the other printings are referred to as the reprinting.

The setup subsection 70 sets up an image processing to be carried out in the prescan processing section 54 and the fine scan processing section 56.

Specifically, at the time of simultaneous print, the setup subsection 70 carries out an auto-setup operation to perform such as construction of density histogram from prescan data, computation of average density, specific % points of the frequencies on the density histogram such as high light (lowest density), shadow (highest density) and the like, computation of the image character quantity such as an LATD (large area transparent density) and a maximum value and a minimum value of the histogram, extraction of a principal part (subject) and the like, sets up a reading condition for the fine scan as described above, determines the kinds and the order of the image processings to be performed out of various image processings mentioned previously according to the density histogram, image characteristic quantities, operator's instruction or the like, further determines a condition for the image processing and supplies the image processing information such as the thus determined kinds of the image processings, their processing order, their image processing conditions or the like to the parameter coordinating subsection 76.

On the other hand, upon reprint, the setup subsection 70 carries out construction of the density histogram and computation of the image characteristic quantities in the same way as at the simultaneous printing so as to set a reading condition for the fine scan, sets the image processing information such as kinds of the image processings, processing order thereof, image processing conditions and the like in order to essentially reproduce the image processing of the simultaneous print using image processing information at simultaneous printing of the relevant frame which the parameter coordinating subsection 76 reads out from the storage means 78 after retrieving it by means of the retrieval information of the frame to be reprinted, and supplies the thus set image processing information to the parameter coordinating subsection 76.

At this point, the setup subsection 70 preferably performs recalculation with reference to the image processing conditions entered by the operator at simultaneous printing.

Further, if the image characteristic quantities or values of the image for the simultaneous print are stored in the storage means 78 which will be described later, the setup subsection 70 may set image processing conditions of the image or the like by performing recalculation together with taking account of or referring to these quantities or values, or using only these quantities or values. At this time, the setup subsection 70 may set the image processing conditions or the like to be executed by performing recalculation referring to or using the image characteristic quantities or values of the image at simultaneous printing as well as the image characteristic quantities or values of a plurality of frames processed prior to the image at the simultaneous printing.

If when the image input condition and image output condition at the time of simultaneous print are referred to, they are different between reprint and simultaneous print, it is permissible to change the image processing condition and the like at the time of reprint, if necessary. If conditions relating to an image structure such as print size and resolution are different between the reprint and simultaneous print, an image processing condition for image processing relating to the image structure, for example, a parameter (e.g., sharpness gain) for sharpness processing, graininess suppressing processing or the like is changed.

In any case of simultaneous print and reprint, the setup subsection 70 is not limited to setting an image processing condition from only an image data of a frame for producing a print, it is permitted to set the image processing condition using, for example, image data of all frames of a film, image data of plural frames processed previously or image data of frames which are before and after the processed frame.

The key correcting subsection 74 computes an adjustment amount for the image processing condition corresponding to an instruction about color adjustment, density adjustment, contrast (tone) adjustment or the like input from the key board 18a and the mouse 18b of the manipulating unit 18 and supplies it to the parameter coordinating subsection 76.

The parameter coordinating subsection 76 receives an image processing condition or the like set by the setup subsection 70, sets a supplied image processing condition at specified sites of the prescan processing section 54 and fine scan processing section 56, and adjusts the image processing condition set at each position corresponding to an adjustment amount or the like computed by the key correcting subsection 74.

At the time of simultaneous print, the parameter coordinating subsection 76 sends to the storage means 78 the retrieval information of the frame whose print is produced and image processing information of that frame with correspondence therebetween after the image processing to be executed is determined. At the time of reprint, from retrieval information of the frame to be reprinted, the parameter coordinating subsection 76 reads image processing information of that frame from the storage means 78 and supplies it to the setup subsection 70. If key adjustment by an operator is carried out at the time of the simultaneous print, image processing information after the key adjustment is transmitted from the parameter coordinating subsection 76 to the storage means 78 and stored therein, which will be described later in detail.

The ID information obtaining subsection 72 is a site which functions as retrieval information inputting means of the invention and obtains frame ID information as retrieval information for identifying a frame to be printed at the time of simultaneous print or reprint to send it to the parameter coordinating subsection 76.

As the frame ID information, at least one of film F identification information, bar code such as DX code to be recorded in the film F, customer identification information, information capable of specifying the image processing apparatus such as identification information of photoprinter 10, processing apparatus 14 or the like, date of print production and/or image processing and frame number is exemplified.

The method or means for obtaining the frame ID information in the ID information obtaining subsection 72 is not limited to any particular one, but various methods and means are available.

For example, if the film F is a film (accommodated in cartridge) of the aforementioned Advanced Photo System, an ID number of the film (cartridge) and a frame number of each frame are recorded as magnetic information in a magnetic recording medium of the film. Therefore, these may be frame the ID information or it is permissible to record other frame ID information than those in the magnetic recording medium of the film F and use it.

Further, it is permissible to use a bar code such as the DX code formed on the film F or it is also permissible to mount a data storage device such as the IC memory or IC card on the film F or its accommodating body and store the frame ID information therein.

Various kinds of information such as the frame number are recorded on the back side of a print as back print (back printing). As this back print, the above-mentioned frame ID information may be recorded and a lab shop may generate a customer card in which customer information is recorded and record the frame ID information such as those described above therein. Further, it is permissible to record optically or physically the frame ID information such as those described above on the film F (out of an image recording region) as bar code information, notch information or the like, or on a case or a bag for accommodating the film F as bar code information so that the thus recorded information is later read optically or visually to be utilized.

In the above example, magnetic information or bar code recorded on the film F are read by the magnetic head 42 or the code reader 44 on the carrier 30 mounted on the scanner 12 and transmitted to the processing apparatus 12. Or the operator inputs frame ID information through a key board 18a or the like, so that the ID information obtaining subsection 72 obtains the frame ID information and this is transmitted to the parameter coordinating subsection 76 and stored in the storage means 78 with correspondence to image processing information at the time of simultaneous print. At the time of reprint, this frame ID information may be used for retrieving image processing information in the storage means 78.

Specifically in an embodiment using the back print, preferably, various frame ID information such as film identification information is automatically generated by the ID information obtaining subsection 72 corresponding to date, customer, processing unit, print system or the like at the time of simultaneous print and transmitted to the printer 16 (back printing means).

In the present invention, the retrieval information for identifying a frame for producing a print is not restricted to such frame ID information, but various kinds thereof may be used.

For example, one or more of the image characteristic value of the frame image, specifically, the aforementioned image characteristic quantities, information of density histogram, information of density histogram of each block after an image is divided to blocks, low resolution image, thumb nail image such as index print, and the like may be used as retrieval information preferably. Meanwhile, the block division of an image is desired to be performed by point symmetry division. The low resolution image may be of spatially low resolution image or density basis low resolution image and if it is a spatial low resolution image, it is preferred to be a low resolution image of less than 16×16 in terms of pixel number. If it is density basis low resolution image, it is preferred to be an image with gradation resolving power different from that of the original image. At this time, as the low resolution image to be used as retrieval information, a result obtained by subjecting a prescanned image to compression processing such as a result of DCT (discrete cosine transform) calculation namely, a result obtained by compressing image data in accordance with JPEG (Joint Photographic Experts Group) which is the international standard coding system of a stationary color image may be adopted.

If the image characteristic values are used as the retrieval information, it is preferable to use as the retrieval information the same information of plural frames processed prior to the frame of interest or information related with frames which are before and after the processed frame. By using this, retrieval precision for image processing information by the parameter coordinating subsection 76 can be largely improved.

When the parameter coordinating subsection 76 retrieves the storage means 78 using various retrieval informations as such described above and reads out the image processing information of the frame to be processed from the storage means 78, it preferably performs retrieval using one or more of the above-described various ID informations in a combination manner as retrieval information. Also, the parameter coordinating subsection 76 preferably performs while including image characteristic quantity of reprint image as retrieval information. It is further preferable to perform retrieval while including image characteristic quantities of a plurality of images which are preceding, or before and after the reprint in addition to the above quantity. Retrieval of the parameter coordinating subsection 76 preferably includes histogram information of the reprint image as retrieval information. It is further preferable to perform retrieval while including histogram information of image in each block produced by splitting the reprint image into blocks in addition to the above information of the reprint image. At this time, block splitting is preferably of a point symmetry division. Retrieval of the parameter coordinating subsection 76 preferably includes low resolution image of reprint image as retrieval information. It is further preferable to include low resolution images of a plurality of images which are preceding, or before and after the reprint image, as well as which include the reprint image, in addition to the above low resolution image.

When the image characteristic value is employed as the retrieval information, upon simultaneous print, an image characteristic value is computed from prescan data of a frame to be subjected to simultaneous print at the setup subsection 70. This value may be received by the parameter coordinating subsection 76 and stored in the storage means 78 with correspondence to image processing information. On the other hand, upon reprint, an image characteristic value is computed from prescan data of a frame to be subjected to reprint at the setup subsection 70 and supplied to the parameter coordinating subsection 76. The parameter coordinating subsection 76 retrieves a frame in which the image characteristic value of simultaneous print coincides with (or is near within a specified range) the image characteristic value of reprint by means of the storage means 78 and reads information of its image processing.

Therefore, in an embodiment in which the image characteristic value is used as the retrieval information, the ID information obtaining subsection 72 is not absolutely necessary.

If the setup subsection 70 computes the aforementioned image characteristic value as the image character quantity for setting the image processing condition or the like, it may be used as the retrieval information.

In the print system of the present invention, it is preferable, at the time of reprint, to display a low resolution image of the simultaneous print and further a reprint of a frame whose image processing information is retrieved and read out by the parameter coordinating subsection 76 and its thumb nail image on the display 20, and verify whether or not the image processing information of a retrieved frame is appropriate.

Further, at this time, it is preferable to display frames before and after the frame of interest at the same time to carry out further accurate verification.

According to the present invention, retrieval by using retrieval information such as the frame ID information, image characteristic quantity and the like is not restricted to retrieval carried out by the parameter coordinating subsection 76, but may be performed by the setup subsection 70 or it is permissible to provide another retrieval section.

The storage means 78 stores retrieval information of each frame and image processing information of simultaneous print of this frame with correspondence therebetween.

Image processing information refers to information of image processing for reproducing the same image processing as for the simultaneous print at the time of reprint, for example, including the kinds of implemented image processings, an order of the image processings, image processing condition (including parameters and relating data) and the like.

Image processing information to be stored in the storage mean 78 such as kinds of above image processings, their order, their image processing conditions or the like may be of an image processing information to be automatically set as a result of the above-described auto-setup operation in the setup subsection 70, of an image processing information to be entered by the operator or the both of the above.

The image processing condition includes various kinds of information capable of reproducing an image processing (condition) at preceding printing depending on an image processing to be implemented, specifically, LUT produced for the image processing, a formula for the processing, a predetermined coefficient for the image processing and the like being exemplified.

For example, for an image processing to be implemented with LUT such as the gray balance adjustment, LUT is stored, and for an image processing to be implemented by MTX computation such as the chroma correction, MTX expression is stored. For the sharpness processing, sharpness gain is stored. Because for the dodging processing, the LUT or a processing formula is set to process the image data and then, a dynamic range is compressed using image data obtained by that processing, this LUT or the processing formula is stored. For the aberration correction such as the geometrical distortion correction and the marginal lumination correction, a function expression indicating a pixel position deviation or a drop of marginal rumination is stored. However, because this function expression is equal to all frames of a single film F, this may be stored as information of the film F.

If the LUT or function expression is produced for each of red, green and blue, each of them is stored.

In addition to these image processing information or instead of the image processing information, the storage means 78 may store one or more of image input information and image output information at the time of simultaneous print of that frame, thumb nail image, image characteristic value and the like.

As the image characteristic value or thumb nail image, it is permissible to store a plurality of frames processed ahead of that given frame. As a result, retrieval precision for the frame using these as retrieval information is improved as described above.

Moreover, the storage means 78 may store a photographic print preparation condition, that is, a condition related with exposure/printing, at preceding (simultaneous) printing including various image processing information as such described above and conditions such as a development condition or the like in relation with the retrieval information.

The storage means 78 for storing the retrieval information and image processing information is not restricted to any particular type but various means are available.

For example, in case of the film F of the Advanced Photo System, it is permissible to use a magnetic recording medium formed in the film F as the storage means 78.

Further, such a recording medium as a floppy disk, magneto-optic recording medium, IC memory or IC card may be used as the storage means 78. In this case, this recording medium is given to a customer with its print and if reprint is requested, this recording medium is received from the customer with the film F and then its information is read by a drive or the like connected to the photoprinter 10.

If a lab shop prepares customer data base, this data base may be used as the storage means 78. Because if such information is stored permanently, the amount of information becomes tremendous and therefore, it is desirable to limit this storage to an appropriately determined specific interval. For example, because in most case, a request for reprint occurs within a month since the simultaneous print, the storage period may be about 1 month after the simultaneous print.

It is permissible to connect an original image information storage means including the storage means 78 and a plurality of image processing apparatuses including the processing apparatus 14 or a personal computer possessed by the lab shop through such a personal computer communication network as LAN and WAN (wide area network) with each other so as to access from one to the other for storing or retrieving retrieval information, image processing information and the like. Namely, the storage means 78 may be arranged such that retrieval information, image processing information or the like is stored in a site (storage device) accessible from the processing apparatuses 14 of a plurality of photoprinters 10 by way of a network. Further, the parameter coordinating subsection 76 may retrieve a plurality of sites (storage device) accessible through a network.

In this case, it is permissible to manage the retrieval information of each frame and its image processing information integrally by center system, and if a request for reprint of the film F is received, it is permissible to access a data base of other lab shop which performs the simultaneous print to obtain the image processing information. Further, it is also permissible to employ a personal computer possessed by a customer as the storage means 78 and store the retrieval information and image processing information at the time of the simultaneous print and access this information at the time of reprint so as to obtain the image processing information.

As described above, image data processed by the prescan processing section 54 of the processing apparatus 14 is transmitted to the display 20 and image data processed by the fine scan processing section 56 is transmitted to the printer 16.

The printer 16 comprises a printer (printing apparatus) for exposing a light-sensitive material (photographic paper) corresponding to supplied image data so as to form a latent image and a processor (developing apparatus) for subjecting an exposed light-sensitive material to a specified wet processing so as to output a finished print.

In the printer, for example, the light-sensitive material is cut to a predetermined length depending on print and a back print is recorded. Then, three kinds of light beams for red, green and blue exposures depending on the spectral sensitivity of the light-sensitive material are modulated corresponding to the output image data output from the processing apparatus 14 so as to deflect the beams in the main scanning direction. Then by transporting the light-sensitive material in the auxiliary scanning direction perpendicular to the main scanning direction, the light-sensitive material is scanned and exposed two-dimensionally with the aforementioned light beam so as to record a latent image and then that light-sensitive material is supplied to the processor. After receiving the light-sensitive material, the processor carries out specified wet type development processing such as color development, bleaching fixing, rinsing and the like, dries it to obtain a print, and sorts the prints by a specified unit of a single film roll and accumulates them.

By describing an operation of the photoprinter 10, the print system of the present invention will be described in detail.

First of all, a case of the simultaneous print will be described.

Upon the simultaneous print, an operator receiving a request for printing the film P mounts a carrier corresponding to the film F at a specified position of the scanner 12 and sets the film F at a specified position of the carrier. Then, the film F (cartridge) is set at a specified position of the carrier 30, instructions about a print size and the like are input and print production start is instructed.

Consequently, the F-number of the variable diaphragm 24 of the scanner 12 and the storage time of the image sensor (line CCD sensor) 34 are set corresponding to the reading condition of the prescan and after that, the carrier 30 transports the film F in the auxiliary scanning direction at a speed suitable for prescan so as to start the prescan. As described above, the film F is slit scanned at a specified reading position so that a projection light is focused on the image sensor 34. An image projected to the film F is separated to red, green and blue and read photoelectrically.

The prescan or fine scan may be performed frame by frame or continuously on all frames or every specified number of frames. For simplification of description, an example of reading a single frame will be described below.

Here, the bar code such as DX code is read by the code reader 44. If the film F is a film of the Advanced Photo System, during transportation of the film F, magnetic information recorded on the film F is read by the magnetic head 42 of the carrier 30 and necessary information is transmitted to the processing apparatus 14.

If the frame ID information is used as the retrieval information, as described above, the ID information obtaining subsection 72 obtains the frame ID information from this magnetic information and the like. Further, the frame ID information may be input by an operator and obtained by the ID information obtaining subsection 72. As described above, this frame ID information may be automatically produced by the ID information obtaining subsection 72 from date and the like.

A description below is based on an assumption that the frame ID information is used as the retrieval information.

An output of the image sensor 34 is amplified by the amplifier 36, converted to digital signals by the A/D converter 38 and transmitted to the processing apparatus 14. After at the data processing section 46, the signals are subjected to a specified processing such as offset correction and converted to digital image data by the log converter 48 and then stored in the prescan memory 50.

If the prescan data is stored in the prescan memory 50, this data is read out by the setup subsection 70 so as to construct a density histogram and compute an image characteristic quantity as described above. From that result, fine scan reading condition such as the F-number of the variable diaphragm 24 is set and transmitted to the scanner 12.

The setup subsection 70 selects an image processing to be executed on a given frame (image) depending on the density histogram, image characteristic quantity and an instruction of an operator so as to determine the order and set (compute)

an image processing condition for each image processing. The set image processing condition is sent to the parameter coordinating subsection 76 and set at a specified site (hardware) of the prescan processing section 54 and fine scan processing section 56 by the parameter coordinating subsection 76.

In case where verification is performed, if an image processing condition is set in the prescan processing section 54, prescan data is read out from the prescan memory 50 and image processing is carried out corresponding to the image processing condition set by the processing subsection 62. Next, the data is supplied to the signal converting subsection 64, converted to image data corresponding to an indication on the display 20 and then prescan image is displayed on the display 20 as simulation image.

The operator confirms (verifies) an image or a result of the processing by watching a representation on the display 20 and if necessary, adjusts color, density, tone and the like with an adjustment key or the like set on the key board 18a.

The adjustment signal is sent to the key correction subsection 14 and the key correction subsection 74 computes a correction amount for the image processing condition corresponding to an input, and transmits this result to the parameter coordinating subsection 76. The parameter coordinating subsection 76 corrects the image processing condition set in the processing subsection 62 and processing subsection 66 depending on the transmitted correction amount. Therefore, an image indicated on the display 20 changes corresponding to an input by the operator.

If the operator confirms (verifies) that the image represented on the display 20 is appropriate, he indicates that matter using the key board 18a or the like.

As a result, the image processing condition is established, so that in this example, the fine scan is started, the scanner 12 is set to fine scan reading condition in which a F-number of the variable diaphragm 24 is, set and then the carrier 30 transports the film F at a speed corresponding to the fine scan, thereby starting the fine scan.

If no verification is performed, when setting of the image processing condition by the parameter coordinating subsection 76 on the fine scan processing section 56 is terminated, the image processing condition is established so that the fine scan is started. Whether or not the verification is performed is desired to be selected as mode.

The fine scan is carried out in the same manner as the prescan except that the reading condition for the F-number of the variable diaphragm 24 is reading condition for the fine scan. An output signal from the image sensor 34 is amplified by the amplifier 36, converted to digital signals by the A/D converter 38, processed by the data processing portion 48 of the processing apparatus 14, converted to fine scan data by the log converter 50 and transmitted to the fine scan memory 52.

If the fine scan data is sent to the fine scan memory 54, it is read out by the fine scan processing section 58. This data is subjected to image processing under an image processing condition established by the processing subsection 66 and converted by the signal converting subsection 68 so as to obtain image data for output. Then, this is output to the printer 16 so that a print is produced from this image data.

If the image processing condition is established, the frame ID information is sent from the ID information obtaining subsection 72 to the parameter coordinating subsection 76. The parameter coordinating subsection 16 sends the frame ID information (retrieval information) with correspondence to the image processing information to the storage means 78 and the storage means 78 stores it.

If the image characteristic value is used as the retrieval information, the setup subsection 70 computes the image characteristic quantity using the prescan data of the simultaneous print and further computes a necessary image characteristic value. This value is supplied to the parameter coordinating subsection 76 and depending on the establishment of the image processing condition, the parameter coordinating subsection 76 sends the image characteristic value (retrieval information) with correspondence to the image processing information to the storage means 78 and the storage means 78 stores it.

In the print system of the present invention, storage of image processing information and frame retrieval information in the storage means 78 is not restricted to the simultaneous print, but if a customer has complaint about an image of simultaneous print and makes a request for reprint by specifying a color or density processing or if a frame whose image processing information is not stored is produced, it is permissible to store the image processing information at this time as an image processing information of that image.

On the other hand, basically, the reprint is performed as follows in the photoprinter 10.

An operator inputs an instruction for reprint and mounts a carrier corresponding to the film F requested to be reprinted on the scanner 12. Then, the film F is mounted on the carrier and an instruction for the reprint and print condition such as a frame to be reprinted and print size are input through the key board 18a, so that print is started.

Consequently, the carrier 30 transports the film F, so that a frame to be reprinted is transported to a reading position thereby starting the prescan.

The present invention is not restricted to a case for the operator to input an instruction for simultaneous print or reprint. However, for example, when the storage means 78 is retrieved by using retrieval information of a frame whose print is to be produced, if there is no corresponding retrieval information or image processing information in the storage means 78, it is permissible to carry out the same processing as the simultaneous print, and if there is corresponding image processing information or the like, it is permissible to carry out the same processing as the reprint.

The prescan is performed in the same manner as the simultaneous print. A projection light of the film F is focused on the image sensor 34 based on the reading condition of the prescan, an output signal is amplified by the amplifier 36 and converted by the A/D converter 38, then converted to the prescan data by the data processing section 46 and log converter 48 and then stored in the prescan memory 50.

Like the simultaneous print, during transportation of the film F for the prescan, information magnetically recorded on the film F and bar code such as the DX code are read by the carrier 30 and necessary information is supplied to the processing apparatus 14. The ID information obtaining subsection 72 obtains the frame ID information according to this magnetic information and the like or the operator inputs the frame ID information through the key board 18a or the like.

If the ID information obtaining subsection 72 obtains the frame ID information (retrieval information) of a frame to be reprinted, the parameter coordinating subsection 76 receives the frame ID information of a frame to be reprinted from the ID information obtaining subsection 72 and by retrieving the storage means 78, reads image processing information of the simultaneous print of a frame corresponding to this frame ID information from the storage means 78 and sends it to the setup subsection 70.

On the other hand, the setup subsection 70 produces density histogram and computes an image characteristic quantity from the prescan data like the simultaneous print, sets the reading condition for the fine scan and sends it to the scanner 12. Further, the setup subsection 70 sets image processing condition and the like according to the computed image characteristic quantity and image processing information sent from the parameter coordinating subsection 76 and then sends it to the parameter coordinating subsection 76. Basically, this image processing is set so that an image processing at the time of the simultaneous print is reproduced.

The parameter coordinating subsection 76 sets the image processing condition and the like at a predetermined position of the fine scan processing section 56.

Upon reprint, preferably, the parameter coordinating subsection 76 retrieves a frame corresponding to the image characteristic value so as to read image processing information. When that information is read, a low resolution image of the simultaneous print, thumb nail image, low resolution of images processed before and after the frame of interest and the like are represented on the display 20 so as to confirm whether or not a frame retrieved from the storage means 78 is appropriate.

Preferably, this representation is performed with an image to be reprinted and further together with images of frames processed before and after the frame of interest.

In this example, by setting the image processing condition in the fine scan processing section 56, the image processing condition is established so that the fine scan is started. Alternatively, if necessary, verification is permitted like the simultaneous print.

Basically, the fine scan is performed in the same manner as the simultaneous print. The scanner 12 is operated according to a supplied reading condition for the fine scan and an output signal from the image sensor 34 is amplified by the amplifier 36, converted to digital signal by the A/D converter 38, processed by the data processing section 46 of the processing apparatus 14, then converted to fine scan data by the log converter 50, transmitted to the fine scan memory 52 and stored therein.

Next, the fine scan data is read out from the fine scan memory 52 and processed under a set processing condition by the processing subsection 66. This data is converted to output image data for recording by the signal converting subsection 68, and output to the printer 16, in which a print is produced from this data.

The image reproduced by this reprint is an image obtained by carrying out the same image processing as the simultaneous print under the same image processing condition. Therefore, this is an image whose color and density are equal to the simultaneous print image.

If the image characteristic values are used as the retrieval information, the setup subsection 70 computes image characteristic quantities using prescan data for the reprint and computes an image characteristic values, and then transmits those to the parameter coordinating subsection 76.

The parameter coordinating subsection 76 retrieves a corresponding frame from the storage means 78 using this image characteristic value (retrieval information), reads image processing information of the simultaneous print and supplies it to the setup subsection 70. After receiving this image processing information, the setup subsection 70 sets an image processing condition and the like as described above and sends it to the parameter coordinating subsection 76, so that the same processing is carried out.

Further, in the print system of the present invention, the image data for output may be output to various kinds of storage mediums such as a floppy disk, MO disc (magnetic recording disk), CD-ROM and the like as well as the printer 16 and stored in an image file.

The print system of the present invention has been described in detail above. The present invention is not restricted to the above-described embodiments, but may be modified or changed without departing from the spirit of the invention.

The print system of the invention is applicable with advantage not only to the digital photoprinter shown in FIG. 1 but also to the conventional direct-exposing (analog exposure) photoprinter. As is well known, the operating principle of the direct-exposing photoprinter is such that projected light carrying the image recorded on a film is focused on a light-sensitive material, which is exposed to the projected light to form a latent image, which in turn is rendered visible by development and subsequent specified processing to produce a print reproducing the image recorded on the film. In order to ensure that the appropriate image is reproduced on the print, the light-sensitive material is exposed to the projected light through the film, with the respective color filters of C (cyan), M (magenta) and Y (yellow) being inserted by suitable amounts into the optical path for adjusting the colors of the image and with the opening of the diaphragm being adjusted to control the quantity of the projected light, thereby adjusting the density of the image. To determine the amounts by which the respective color filters are inserted into the optical path and the amount of adjustment of the diaphragm's opening, the image recorded on the film may be read photoelectrically to obtain image data (input image data) and the quantities of image features such as the LATD, highlight and shadow of the image are calculated for use as the basis for the determination.

When using the print system of the invention in a direct-exposing photoprinter, the amounts by which the respective color filters were inserted into the optical path in simultaneous printing and the amount of adjustment of the diaphragm's opening are stored in the memory means as information about image processing and in the process of reprinting, the stored information about image processing is retrieved in accordance with the frame identifying information that was received in the same manner as described in the foregoing cases and the same exposing conditions as employed in the simultaneous printing are duplicated and used to perform exposure with the projected light for producing a re-print.

Alternatively, in a same manner as in the aforementioned digital photoprinter, input image data (itself, reduced image, compressed data and resolution lowering data), photometry data of the produced print (itself, reduced image, compressed data and resolution lowering data) and the like are stored and may thereafter be utilized for the reprinting While the print system of the present invention has been described above in detail, it should be noted that the invention is by no means limited to the embodiments described above and that various improvements and modifications can be made without departing from the scope and spirit of the invention.

As described in detail on the foregoing pages, the print system of the invention enables the production of re-prints that feature consistent reproduction of an image having the same color and density as the image reproduced by simultaneous printing and, hence, re-prints that fully meet a customer's request can be outputted in a satisfactory manner.

What is claimed is:

1. A print system, comprising:

image processing means for performing image processing on an original image or image data thereof; and image outputting means for outputting a photographic print in which said original image is reproduced as a visible image, wherein image processing information of said original image at preceding printing can be used again at following printing;

storage means for storing said image processing information of said original image at the preceding printing and retrieval information used for retrieving an original image information corresponding to said image processing information at the following printing;

retrieval means for retrieving a relevant original image information among a plurality of the original image information stored by the storage means, based on the retrieval information used for retrieving the original image information at the following printing;

setting means for setting the image processing information of said original image at the following printing, based on said relevant original image information retrieved by retrieval means, wherein said image processing means subjects said original image or said image data thereof to the image processing in accordance with the image processing information set by said setting means and then, said image outputting means outputs a following photographic print based on the original image or the image data thereof subjected to said image processing by said image processing means.

2. The print system according to claim 1, further comprising retrieval information inputting means for inputting said retrieval information.

3. The print system according to claim 1, further comprising image inputting means for inputting said original image or image data of said original image.

4. The print system according to claim 1, wherein the setting means obtains said original image as image data at said preceding printing and sets said image processing information in accordance with at least one of the thus obtained image data and a command to be inputted from outside.

5. The print system according to claim 1, wherein said preceding printing represents simultaneous printing whereas said following printing represents reprinting.

6. The print system according to claim 1, wherein said image processing information includes kind, order and image processing condition of said image processing to be performed by said image processing means.

7. The print system according to claim 1, wherein said storage means stores said image processing information and said retrieval information in a site accessible from a plurality of print systems through a network.

8. The print system according to claim 1, wherein said retrieval means retrieves a plurality of sites accessible through a network.

9. The print system according to claim 1, wherein said image processing information stored by said storage means includes at least one of the image processing information to be automatically set and the image processing information to be inputted from outside.

10. The print system according to claim 1, wherein said image processing information stored by said storage means includes at least one of image input condition, image output condition, a thumbnail image, image characteristic quantity of said original image and image characteristic quantities of a plurality of images processed prior to said original image.

11. The print system according to claim 1, wherein said retrieval information stored by said storage means includes at least one of film ID, DX code, user ID, information capable of specifying an image processing apparatus comprising said image processing means, date and time of having performed the image processing, frame number, image characteristic quantity of said original image, image characteristic quantities of a plurality of images processed prior to said original image, histogram information, histogram information of each block image produced by splitting said original image into blocks and image data of low resolution image of said original image.

12. The print system according to claim 11, wherein if said block image is produced by splitting said original image into blocks, each block image is obtained by splitting image region of said original image in point symmetry.

13. The print system according to claim 11, wherein if said image data of said low resolution image of said original image is included, said low resolution image is at least one of an image having the number of pixels being 16×16 or less or an image having gradation resolution different from that of said original image.

14. The print system according to claim 2, wherein said retrieval information inputting means inputs as said retrieval information at least one of film ID, DX code, user ID, information capable of specifying an image processing apparatus comprising said image processing means, date and time of having performed the image processing, frame number, image characteristic quantity of said original image and image characteristic quantities of a plurality of images processed prior to said original image.

15. The print system according to claim 2, wherein said retrieval information to be inputted by said retrieval information inputting means includes information based on at least one of back print information of the photographic print, a customer card, a magnetic recording layer of a film image and information recording means of the film image.

16. The print system according to claim 15, wherein at least one of the back print information of said photographic print, the customer card, the magnetic recording layer of the film image and the information recording means of the film image includes at least one of film ID, DX code, user ID, information capable of specifying an image processing apparatus comprising said image processing means, date and time of having performed the image processing and frame number.

17. The print system according to claim 1, wherein said retrieval means retrieves as said retrieval information in a combination manner at least one of film ID, DX code, user ID, information capable of specifying an image processing apparatus comprising said image processing means, date and time of having performed the image processing and frame number.

18. The print system according to claim 1, wherein said retrieval means includes as said retrieval information at least one of image characteristic quantity of image of said following photographic print, image characteristic quantities of a plurality of images processed prior to the image of said following photographic print, histogram information of image of said following photographic print, histogram information of each block image produced by splitting the image of said following photographic print into blocks, image data of low resolution image of said following photographic print and image data of low resolution images of a plurality of images which are before and after the image of the photographic print including the image itself.

19. The print system according to claim 1, wherein said retrieval means is capable of performing confirmation by representing at least one of thumbnail image of the original image at said preceding printing, low resolution image of the image at said preceding printing and low resolution images of a plurality of images which are before and after the image at said preceding printing including the image itself.

20. The print system according to claim 19, wherein said retrieval means further performs confirmation by representing simultaneously at least one of the thumbnail image at said following printing, the low resolution image of image at said following printing and low resolution images of a plurality of images which are before and after the image at said following printing including the image itself.

21. The print system according to claim 1, wherein said setting means performs recalculation by reference to at least one of image processing condition to be inputted from outside at said preceding printing, image inputting condition and image outputting condition both at said preceding printing, image characteristic quantity at said preceding printing and image characteristic quantities of a plurality of images processed prior to the preceding printing together with the image characteristic quantity at said preceding printing.

22. A photographic printer capable of utilizing print preparation condition of an original image at preceding printing for following printing again, comprising:

print preparation information storage means for storing the print preparation condition of the original image at said preceding printing and retrieval information to be used for retrieving, at said following printing, an original image information corresponding to said print preparation condition of the original image;

retrieval information inputting means for inputting retrieval information to be used for retrieval said original image information at said following printing;

original information retrieval means for retrieving a relevant original image information from among a plurality of said original image information stored in said print preparation information storage means based on said retrieval information inputted by said retrieval information inputting means;

print condition determination means for determining the print preparation condition of said original image at said following printing corresponding to said relevant original image information retrieved by said original image information retrieval means; and photographic print preparation means for preparing a photographic print out of said original image at said following printing in accordance with the print preparation condition of said original image at said following printing determined by said print condition determination means.

23. The system of claim 2, wherein the setting means sets image processing in accordance with at least one of a density histogram, average density of the original image, shadow and highlight frequencies.

24. The system of claim 3, wherein the print preparation condition comprises at least on of a density histogram, average density of the original image, shadow and highlight frequencies.

25. The system of claim 23, wherein the setting means determines the image processing based on a low-resolution pre-scan of the original image, said image processing further being used during image processing of a high-resolution fine scan of the original image.

26. A print system for performing image processing on an original image and outputting a print in which said original image is reproduced as a visible image, comprising:

image processing means for performing the image processing on said original image or image data thereof;

setting means for setting the image processing in said image processing means with said original image as image data, in accordance with at least one of the image data, and an instruction input from outside;

storage means for storing image processing information of said original image processed by said image processing means and retrieval information for retrieving the original image with correspondence there between; and retrieval means for retrieving the image processing information of the original image of interest in accordance with supplied retrieval information, wherein when said image processing means reprocesses the original image storing the image processing condition and the retrieval information, said setting means sets the image processing by said image processing means in this reprocessing by adding the image processing information retrieved by said retrieval means, wherein the setting means sets image processing in accordance with at least one of a density histogram, average density of the original image, shadow and highlight frequencies.

27. The system of claim 26, wherein the setting means determines the image processing based on a low-resolution pre-scan of the original image, said image processing further being used during image processing of a high-resolution fine scan of the original image.

* * * * *